May 7, 1968     G. H. WATSON     3,381,427
FRANGIBLE AND EXPANDABLE ASSEMBLY FOR PARKING METER
SUPPORTS, STANCHIONS, POLES AND POSTS
Filed Oct. 23, 1965
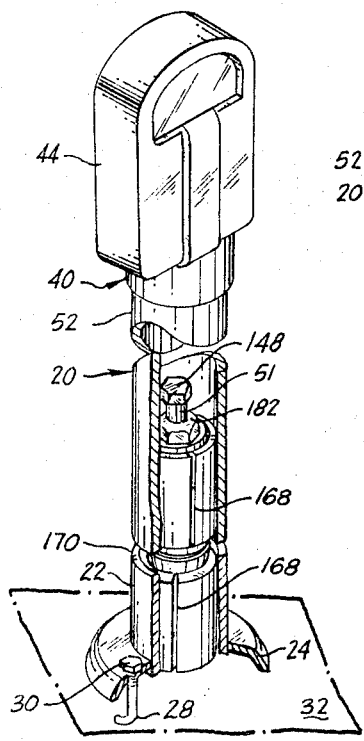
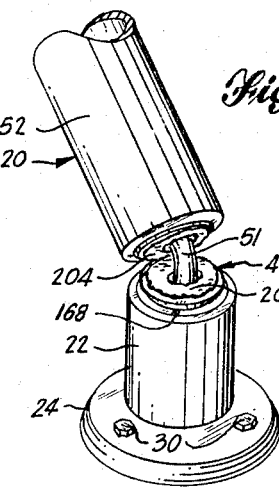
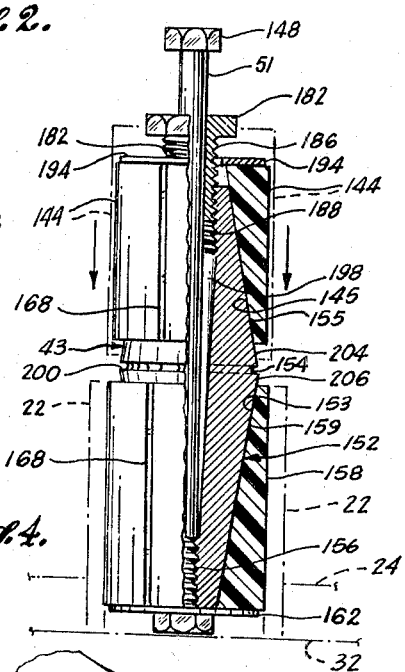
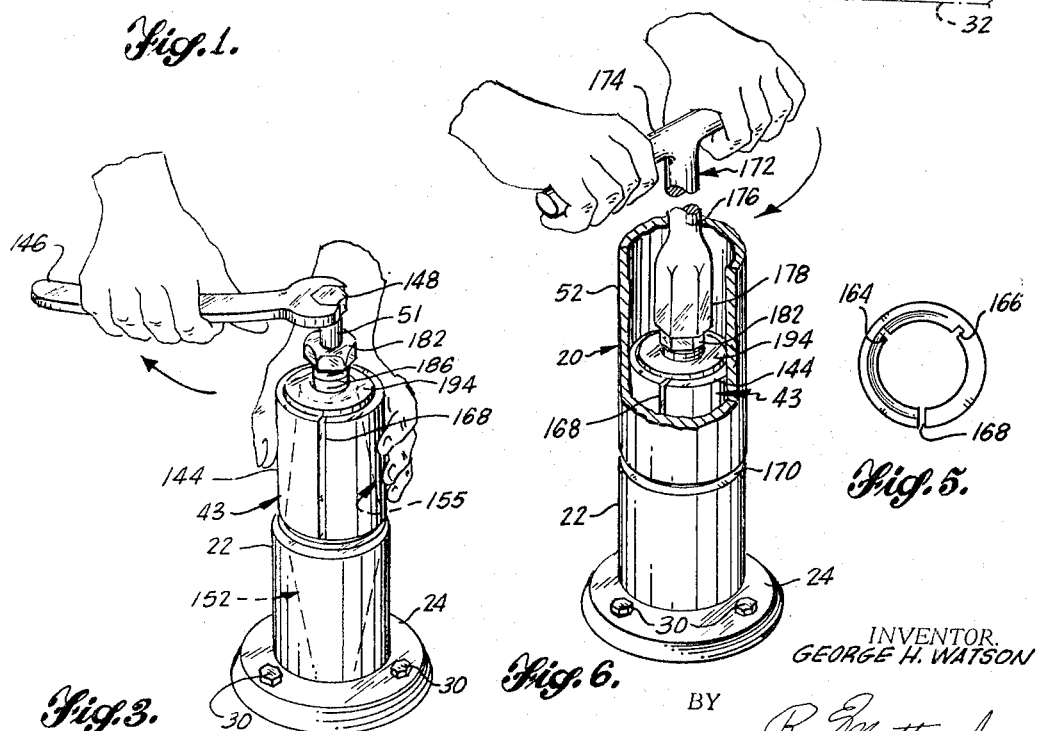
INVENTOR.
GEORGE H. WATSON
BY
Roy Mattern Jr.
ATTORNEY United States Patent Office 3,381,427
Patented May 7, 1968

3,381,427
FRANGIBLE AND EXPANDABLE ASSEMBLY FOR PARKING METER SUPPORTS, STANCHIONS, POLES AND POSTS
George H. Watson, 11530 Holmes Drive NE., Kirkland, Wash. 98033
Filed Oct. 23, 1965, Ser. No. 502,996
4 Claims. (Cl. 52—98)

ABSTRACT OF THE DISCLOSURE

Frangible, expandable and bendable connector assemblies form part of supports, stanchions, poles and posts such as are used to support parking meters, traffic signs and street signs to predetermine fracturing and bending locations in anticipation of vehicles striking the overall support. A preferred embodiment of this connector assembly, comprises: a central connector, having a hollow frangible cross-section between its ends, tapered hollow portions tapering to smaller outside diameter ends above and below its hollow frangible cross-section; hollow tapered sleeves fitted endwise over each respective matching tapered hollow portions of the insert body and having longitudinal cuts to permit their radial expansion when relative movement occurs between these tapered sleeves and tapered body portions; and a bendable adjusting and fastening means positioned throughout the hollow central connector and tapered sleeves to contact the tapered sleeves and, upon installation of the connector assembly, to move the tapered sleeves toward one another expanding them over the tapered central connector into contact with portions of an overall support and thereafter remaining in place to keep the components of the overall support together upon and after impact.

---

This invention relates to hollow structures such as supports, stanchions, poles, and posts which may be used to support parking meters, traffic signs, and street signs. More particularly, the invention pertains to frangible, expandable and bendable connector assemblies to be included in such upright structures to predetermine their fracturing and bending locations in anticipation of vehicles striking them.

The application concerns a new design of frangible connector assemblies to be used as described in my co-pending patent, application Ser. No. 383,193, now Patent 3,349,531. The frangible connector assembly illustrated and described herein is expandable radially to compensate for different variations in inside diameters of structural pipes. These variations occur because manufacturers of such hollow structures often hold constant outside diameters but let inside diameters change as production dies wear. In so compensating for these variations, installation of this new design of the frangible connector assembly is undertaken more conveniently, accurately and quickly. Torque forces rather than driving forces are employed during its installation.

The purpose of the invention is to provide such connector or coupling assemblies for installation in resulting upright structures which effectively predetermine both a failure and bending location where the connector is installed. Thereafter, when a resulting upright structure is accidentally struck by a vehicle or in some other severe manner, damage is concentrated in such frangible connector assembly. Generally, repairs are limited to replacement of this connector at substantially lower cost than any cost that would be incurred if an entire upright structure, not so equipped with such a connector, had received a like blow and was repaired and replaced. In most instances when meter sign and marker standard equipped with this frangible coupling are subjected to a blow, the force of which, without this connector installation, would bend the pipe standard and/or break the concrete footing, the resulting needed repairs are effected by replacing only the connecter.

In fulfilling this inventive purpose, these exemplary objectives have been met:

Connectors or couplings are made, in reference to their breakable portions, of metal, plastic, or other brittle compositions;

Connectors are readily provided in selective sizes to be installed in various upright structural supports now in use;

Connectors in each selective size are capable through expansion to fit tightly in supports, stanchions, poles or posts which have slightly different inside diameters because of production die wear;

All connectors have an internal bolt which serves as a threaded member during assembly and installation and thereafter serves as a secondary connecting structure between resulting lower and upper portions of a damaged connector and consequently also between upper and lower portions of an upright structural support or stanchion which still retain their respective, now damaged and separated, connector portions or sections. This secondary bendable connecting structure will protect supported parking meters from any damage or further damage which might otherwise occur, due to striking objects or ground upon their falling following a vehicle impact;

All connectors have continuing structural continuity afforded by secondary bendable structure to prevent unauthorized removal of such uprights and, for example, their installed meters and signs;

Each connector has a central potential reserve or standby coupling which also concurrently serves as a pulling link or coupling to remove resulting connector portions or sections from their surrounding respective portions or sections of the major upright structural standard, support or stanchion during repair operations undertaken to return, for example, a damaged meter or sign assembly to active traffic service.

A preferred embodiment of this invention for inclusion in a supporting structure, is a connector assembly, comprising: a central connector, coupling, pin or insert body having a hollow frangible cross-section between its ends, tapered hollow portions tapering to smaller outside diameter ends above and below its hollow frangible cross-section, threaded bores in respective ends of these tapered hollow portions; tapered sleeves fitted endwise over each respective matching tapered hollow portions of the insert body and having longitudinal serrations and cuts to permit their radial expansion when relative movement occurs between these tapered sleeves and tapered body portions; and a threaded assembly of bolts, nuts and washers positioned along the center line of the hollow insert body and tightened against the tapered sleeves, utilizing threads in bores of the tapered hollow portions of the insert body, upon the application of torque producing forces to drive these tapered sleeves toward one another and over the respective tapered body portions, thereby increasing the outside diameter of the overall connector assembly whereby the connector assembly is fitted to many variable diameter interiors of stanchion, pipe, post, pole and standard sections which are connected together to support parking meters, signs, etc.

This embodiment of the invention is illustrated in the drawings, wherein:

FIGURE 1 is a perspective view, with portions removed for illustrative purposes, of a parking meter installation which includes a preferred embodiment of an installed frangible, bendable and expandable connector assembly to protect such installation upon an impact;

FIGURE 2 is a slightly enlarged perspective view of lower portions only of the installation shown in FIGURE 1 showing the positioning of these portions following an impact;

FIGURE 3 is a perspective view indicating how the preferred embodiment of FIGURES 1 and 2 is positioned for installation and is tightened into place in the lower portion of the parking meter supporting pipe, post or stanchion;

FIGURE 4 is a side elevation with portions broken away of the preferred embodiment of FIGURES 1, 2 and 3 showing how the frangible, bendable and expandable connector assembly has been expandably tightened into place in the lower portion, indicated in dotted lines, as illustrated in FIGURE 3, with dotted lines also indicating how the upper portions of the connector assembly must be expanded as shown further in FIGURE 6;

FIGURE 5 is an end view of the tapered sleeve fitted around the upper portion of the insert body of the connector assembly shown in FIGURE 4, illustrating how this tapered sleeve is grooved and severed to accommodate its radially expansion as it is moved longitudinally as indicated by dotted lines in FIGURE 4; and FIGURE 6 is a perspective view indicating tightening of the frangible, bendable, and expandable connector assembly within parking meter installation of FIGURE 1, with portions removed of both the upper portion of the parking meter supporting pipe, post or stanchion and the co-extensive vertical body of the tightening tool.

The invention illustrated in these figures of the drawing is principally directed to substantially reducing costs and associated time spent in repairing and replacing upright supporting structures which are damaged by misdirected vehicles. An outstanding cost and time reduction is realized in repair and replacement of parking meter installations such as illustrated in FIGURE 1. By necessity, they are located near curbs and are consequently struck by vehicles which may be only slightly misdirected. Oftentimes, delivery trucks during angular backing maneuvers, strike parking meter installations. Where existing concrete has been black-topped, the reduced curb heights often fail to redirect a vehicle and installations are struck. During winter snow conditions all curbs are overrun quite easily. Also during and after heavy snow falls, curbs and meters are obscured by drifts or snow plow piles of snow and, as a result, parking meter and other traffic installations not seen, are struck. Fortunately, in many cases, striking vehicles are moving comparatively slowly and can be stopped before complete overrunning occurs of traffic equipment such as parking meters. Whether or not partial or complete repairs are necessary, this invention reduces repair costs and associated time.

The invention is utilized when either making repairs to a damaged installation or erecting a new installation. When repairs are made to a damaged installation in which the invention had been previously incorporated, considerable saving of costs and time is realized.

As noted in FIGURE 1, lower portions 22 of upright supporting structures 20 may be flanged 24, drilled, and secured with anchor bolts 28 and nuts 30 to supporting sidewalks 32 near curbing and street pavements. Or lower portions 22 may be set directly into concrete recesses, preferably when the concrete is poured (not shown). Where primary attachment is undertaken in either of these constructions, or one of comparable permanency, as generally occurs wherever parking meter installations are completed, any resulting change or replacement of cemented in anchor bolts 28 or lower portions 22 is costly and time consuming. Concrete chipping and new concrete work substantially increases overall costs and time of undertaking repairs. Generally heavy and cumbersome repair tooling is often needed and the inconvenience in transporting and operating such heavy equipment adds to costs and time consumed. Therefore, for example, when a parking meter installation 40 is damaged, if repairing of upright structure 20 may be done quickly with minimum tooling and substantially complete avoidance of reworking primary attachments 22 generally involving concrete work, then very considerable time and cost savings are realized. To insure that such reworking of primary attachments 22 is not needed in substantially all repair work, this invention provides a connecting and coupling structural assembly 42 which protects primary attachment portions 22 of upright supporting structure 20. Moreover, where a striking vehicle stops before or overruns without completely destroying traffic control apparatus 44 such as a parking meter, sign or light, the connecting and coupling structural assembly 43 also protects such apparatus 44 from damage which might otherwise occur upon complete failure of upright supporting structure 20 causing a parking meter 44, for example, to strike pavement of the sidewalk 32 or street.

The way in which protection is provided is illustrated in FIGURE 2 which indicates how frangible, expandable and bendable connecting and coupling assembly 43 has been fractured upon impact to the parking meter installation 40, while portions 22, 52 of upright structure remain substantially free of damage and yet confined with respect to another by a threaded coupling assembly having a bendable bolt 51. The construction of protection assembly 43 and its installation is further revealed in FIGURES 3, 4, 5 and 6.

The frangible, expandable and bendable coupling assembly 43 is placed into lower portion 22 of upright supporting structure 20 which is formed of hollow pipe sections 22, 52. This first inserted end of assembly 43 is identified by having a threaded portion 140 on bendable bolt 51 which terminates at a nut 142 which is threaded on bolt 51 and welded. With a hand grip applied to top tapered sleeve 144 and a hand torque applied with wrench 146 to bolt head 148, central tapered threaded hollow body 152 and its hollow frangible cross section 154 is caused to move relative to bolt 51. In so doing, as welded nut 142 carried by bolt 51 moves closer to central body 152 as bolt 51 turns on its threads 156, nut 142, through cooperation of its washer 162 causes bottom tapered sleeve 158 to move axially toward hollow frangible cross section 154. As this relative axial movement occurs, serrations 164, 166, and slit 168, all on bottom positioned tapered sleeve 158, as shown in FIGURE 5, become effective permitting its radial expansion as the respective tapered structures 159, 153 of the sleeve and central body perform their cooperating function. In this way frangible, expandable and bendable coupling assembly 43 is tightly fitted within lower pipe section 22, as illustrated in FIGURES 3 and 4.

Then top pipe section 52 of upright structure 20 is lowered over coupling assembly 43 and spaced just above hollow frangible cross section 154, leaving a minimal gap 170 which in cold climates can be sealed with a gasket, etc. Thereafter another hand tool 172 with a cross handle 174, long shaft 176 and extension socket wrench end 178 is lowered through pipe section 52 of upright supporting structure 20 to fit over flat sided head 182. This head 182 is a portion of a hollow bolt member 184 which is slidable along bolt 51, having been so assembled before nut 142 was welded in place. On its exterior, member 184 is threaded 186 to match internal threads 188 on central body 152. Therefore when hand tool 172, secured over head 182 of hollow externally threaded member 184, is rotated, top tapered sleeve 144, with respect to its tapered surfaces 145 is driven axially and expanded radially over like tapered portions 155 of central body 152, as indicated in FIGURES 4 and 6. Top tapered sleeve 144 is also formed with serrations 164–166 and a slit 168. In this way section 52 is firmly installed completing the upright structure 20. Thereafter the normal attachment of a parking meter 44 is undertaken.

Because of the firm first installation of central body 152 in lower portion 22 of upright structure 20, this central body 152 does not turn and relative axial motion between central body 152 and hollow bolt member 184 is assured. Head 182 may be large enough not to require a washer 194, which however, is shown in FIGURES 1, 3, 4 and 6 as an aid in transmitting axial force to top tapered sleeve 144.

Because of differences in internal thread diameters and need for controlling frangibility at hollow frangible cross section 154, the unthreaded interior 198 of central body 152 is gradually changed in diameter as illustrated in FIGURE 4. By proper design of this unthreaded interior 198 in reference to selected frangible materials, breakage at cross section 154 is assured, continuing its external cut 200, to complete the separation of top 204 and bottom 206 of central body 152 and consequently like separation of top 52 and bottom 22 of upright structure 20. Such separation, however, is restrained and controlled by bolt 51 serving its coupling function with aid of its assembled components and the continuing grip afforded by top and bottom tapered expandable sleeves, 144 and 158.

I claim:

1. A frangible, expandable and bendable connector to be aligned with and to join together top and bottom portions of an overall supporting structure, comprising: a central hollow internally threaded body having a frangible mid section and having tapered exterior surfaces above and below the frangible mid section; hollow sleeves tapered internally to axially overlap in part the tapered exterior surfaces of the central body and cylindrically formed externally with expandable structure to be fitted and aligned with respective top and bottom portions of an overall structure; and bendable centrally positioned threaded axially contracting force means axially positioned within and beyond the threaded hollow core of the central body which upon turning on the threads of the central body causes relative axial movement between the sleeves and central body along their tapered surfaces increasing their axial overlap and causing expansion of the sleeves.

2. A frangible, expandable and bendable connector to join together top and bottom portions of an overall supporting structure, such as the base and upright portions of a parking meter support, the connector serving to localize any impact damage within itself thereby protecting the resulting base and upright portions and also the parking meter itself, comprising:
  (a) a central hollow internally threaded body having a mid section with an exterior circumferential narrow serration made to reduce the net section of this central body, and having tapered exterior surfaces above and below the serrated mid section;
  (b) hollow internally axially serrated sleeves tapered internally to axially overlap in part the tapered exterior surfaces of the central body and having an external surface of cylindrical shape with a starting diameter slightly larger than the central body which external surfaces upon transverse movement of these sleeves tightly fit top and bottom portions of an overall supporting structure; and
  (c) bendable centrally positioned threaded assembly for producing originally axially directed contracting forces and thereafter providing axial and bending restraining forces, axially positioned within and beyond the threaded hollow core of the central body which assembly upon turning on the threads of the central body causes relative axial movement between the sleeves and central body along their tapered surfaces increasing their axial overlap and causing expansion of the sleeves, this bendable centrally positioned threaded assembly, comprising: load distributing washers, a headed threaded bolt of greater length than length of the central body; a headed larger diameter hollow short threaded bolt slidably placed over the long bolt; then after insertion of the long bolt threaded end through the central body and sleeves, a nut is threaded on flush with the long bolt end and welded to become a part of this sub-assembly and entrapping the overall assembly of the connector composed of the load distributing washers, long bolt, shorter bolt, welded nut, sleeves and central body.

3. A frangible, expandable and bendable connector to be aligned with and to join together top and bottom portions of an overall supporting structure, comprising: a central hollow internally threaded body having a mid section with an exterior narrow serration made to reduce the net section of the central body and having tapered exterior surfaces above and below the serrated narrow mid section; hollow sleeves tapered internally to axially overlap in part the tapered exterior surfaces of the central body and cylindrically formed externally with expandable structure to be fitted to and aligned with respective top and bottom portions of an overall structure; and bendable centrally positioned threaded axially contracting force means axially positioned within and beyond the threaded, hollow core of the central body which upon turning on the threads of the central body causes relative axial movement between the sleeves and central body along their tapered surfaces increasing their axial overlap and causing expansion of the sleeves, this bendable centrally positioned threaded axially contracting force means comprising: a headed bolt of a length greater than the connector, a hollow larger diameter bolt of shorter length externally threaded slipped over the shank of the headed bolt, and a nut welded to the terminal threads of the longer bolt.

4. Structure for connecting an upper support member to a lower anchored support member comprising a sacrificial self-contained connector assembly, said connector assembly having an upper section of radially expandable cooperating structures adapted for connection to the lower end of said upper support member and a lower section of radially expandable cooperating structures adapted for connection to the upper end of said lower anchored support member to rigidly connect said support members with the adjacent ends of said support members being spaced apart about the central region of said connector assembly, said central region of said connector assembly being frangible upon impact applied to said upper support member, said connector assembly having axially spaced upper and lower bearing surfaces, a bendable retainer carried by said connector assembly, said retainer having upper and lower axially spaced bearing surfaces, the spacing between the bearing surfaces on said retainer being greater than the spacing of the bearing surfaces on said connector assembly whereby said retainer loosely connects said upper and lower connector sections and is operable when said connector assembly has been broken to maintain said upper support member connected to said lower anchored support member while permitting limited axial separation of said connector sections sufficient to accommodate controlled tilting movement of said upper support member with respect to said lower anchored support member, cooperating means on said retainer and said lower connector section for expanding said lower connector section into tight locking engagement with said anchored support member, and means accessible from the upper end of said connector assembly for expanding said upper connector assembly into tight locking engagement with said upper support member.

References Cited

UNITED STATES PATENTS

| | | |
|---|---|---|
| 286,182 | 10/1883 | Cunningham et al. |
| 423,633 | 3/1890 | Saxon et al. _____ 287—189.36 |
| 626,040 | 5/1899 | Rowlands _____ 85—73 |
| 1,800,010 | 4/1931 | Emerson. |
| 1,839,690 | 1/1932 | Malinowski _____ 285—2 |
| 2,085,074 | 6/1937 | Boyles _____ 287—108 |
| 2,456,480 | 12/1948 | Austin _____ 85—67 X |
| 2,496,032 | 1/1950 | Austin. |
| 2,872,227 | 2/1959 | Wachs. |
| 3,078,002 | 2/1963 | Rodgers _____ 85—73 |
| 3,307,833 | 3/1967 | Muller et al. _____ 256—13.1 |
| 3,323,781 | 6/1967 | Murdock _____ 256—67 |

DAVID J. WILLIAMOWSKY, *Primary Examiner.*

D. L. TAYLOR, *Examiner.*